US007567986B2

(12) United States Patent
Pudipeddi

(10) Patent No.: US 7,567,986 B2
(45) Date of Patent: Jul. 28, 2009

(54) METHOD AND SYSTEM FOR LIMITING RESOURCE USAGE OF A VERSION STORE

(75) Inventor: Ravisankar V. Pudipeddi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 10/960,675

(22) Filed: Oct. 7, 2004

(65) Prior Publication Data

US 2006/0080367 A1 Apr. 13, 2006

(51) Int. Cl.
  G06F 17/30 (2006.01)
(52) U.S. Cl. ........................... 707/200; 707/100
(58) Field of Classification Search ............... None
  See application file for complete search history.

(56) References Cited

U.S. PATENT DOCUMENTS

| 5,442,763 | A  | * | 8/1995  | Bartfai et al. ............... 711/145 |
| 5,748,468 | A  | * | 5/1998  | Notenboom et al. ........... 700/3    |
| 5,905,889 | A  | * | 5/1999  | Wilhelm, Jr. ................ 718/104 |
| 6,006,247 | A  | * | 12/1999 | Browning et al. ........... 718/102   |
| 6,237,001 | B1 | * | 5/2001  | Bamford et al. ............. 707/100  |
| 6,353,898 | B1 | * | 3/2002  | Wipfel et al. ................ 714/48  |
| 6,415,196 | B1 | * | 7/2002  | Crampton et al. ........... 700/100   |
| 6,523,058 | B1 |   | 2/2003  | Fung et al. ................. 709/100  |
| 6,567,827 | B2 | * | 5/2003  | Bamford et al. ............. 707/203  |
| 6,832,248 | B1 | * | 12/2004 | Byrnes ........................ 709/223 |
| 6,981,114 | B1 | * | 12/2005 | Wu et al. .................... 711/162  |
| 2003/0145035 | A1 | * | 7/2003 | de Bonet .................... 709/102  |
| 2003/0163734 | A1 | * | 8/2003 | Yoshimura et al. .......... 713/201   |
| 2003/0220935 | A1 | * | 11/2003| Vivian et al. ................ 707/102 |
| 2004/0006578 | A1 | * | 1/2004 | Yu et al. ..................... 707/201 |
| 2004/0025169 | A1 |   | 2/2004 | Wiser et al. ................. 719/315  |
| 2004/0249838 | A1 | * | 12/2004| Hinshaw et al. ............. 707/100   |
| 2004/0267747 | A1 | * | 12/2004| Choi et al. ..................... 707/8  |

OTHER PUBLICATIONS

Herlihy et al. "Transactional Memory: Architectural Support for Lock-Free Structures",Computer Architecture, 1993, May 16-19, 1993, p. 289-300.*
Jim Gray, Andreas Reuter: "Transaction Processing; concepts and techniques", Morgan Kaufmann Publishers, Inc., San Francisco, California—1993. (p. 247).

* cited by examiner

Primary Examiner—Charles Rones
Assistant Examiner—Yuk Ting Choi
(74) Attorney, Agent, or Firm—Workman Nydegger

(57) ABSTRACT

A method and system for limiting resource usage of a version store. A limit indicates a total amount of resources that may be consumed by in-progress transactions. A running total of the amount of remaining resources is maintained. Before a new transaction is started, a determination is made as to whether there are enough resources remaining to complete the new transaction. If so, the transaction starts and the running total is adjusted. If not, the transaction waits until more resources are available. When a transaction completes, if it is the oldest in-progress transaction, resources are released. Otherwise, the resources associated with the transaction are not released until all transactions that started before the transaction have completed. This ensures that a client of a version store does not exceed the limit of resources that may be consumed by in-progress transactions.

23 Claims, 7 Drawing Sheets

METHOD AND SYSTEM FOR LIMITING RESOURCE USAGE OF A VERSION STORE

FIELD OF THE INVENTION

The invention relates generally to computers, and more particularly to resource usage.

BACKGROUND

Each time a client initiates a transaction with a version store, such as a database, a certain number of resources are consumed. These resources may continue to be consumed even after the transaction commits or aborts until all transactions that were initiated prior to the transaction have also completed. In a version store with a high frequency of changes, such as a file replication system (FRS), or in a version store having a small amount of resources compared to concurrent transactions, the resources needed by transactions in progress may exceed the amount of resources that are available. What is needed is a method and system for limiting resource usage of a version store.

SUMMARY

Briefly, the present invention provides a method and system for limiting resource usage of a version store. A limit indicates a total amount of resources that may be consumed by in-progress transactions. A running total of the amount of remaining resources is maintained. Before a new transaction is started, a determination is made as to whether there are enough resources remaining to complete the new transaction. If so, the transaction starts and the running total is adjusted. If not, the transaction waits until more resources are available. When a transaction completes, if it is the oldest in-progress transaction, resources are released. Otherwise, the resources associated with the transaction are not released until all transactions that started before the transaction have completed. This ensures that a client of a version store does not exceed the limit of resources that may be consumed by in-progress transactions.

Other advantages will become apparent from the following detailed description when taken in conjunction with the drawings, in which:

DETAILED DESCRIPTION

Exemplary Operating Environment

Figure 1:
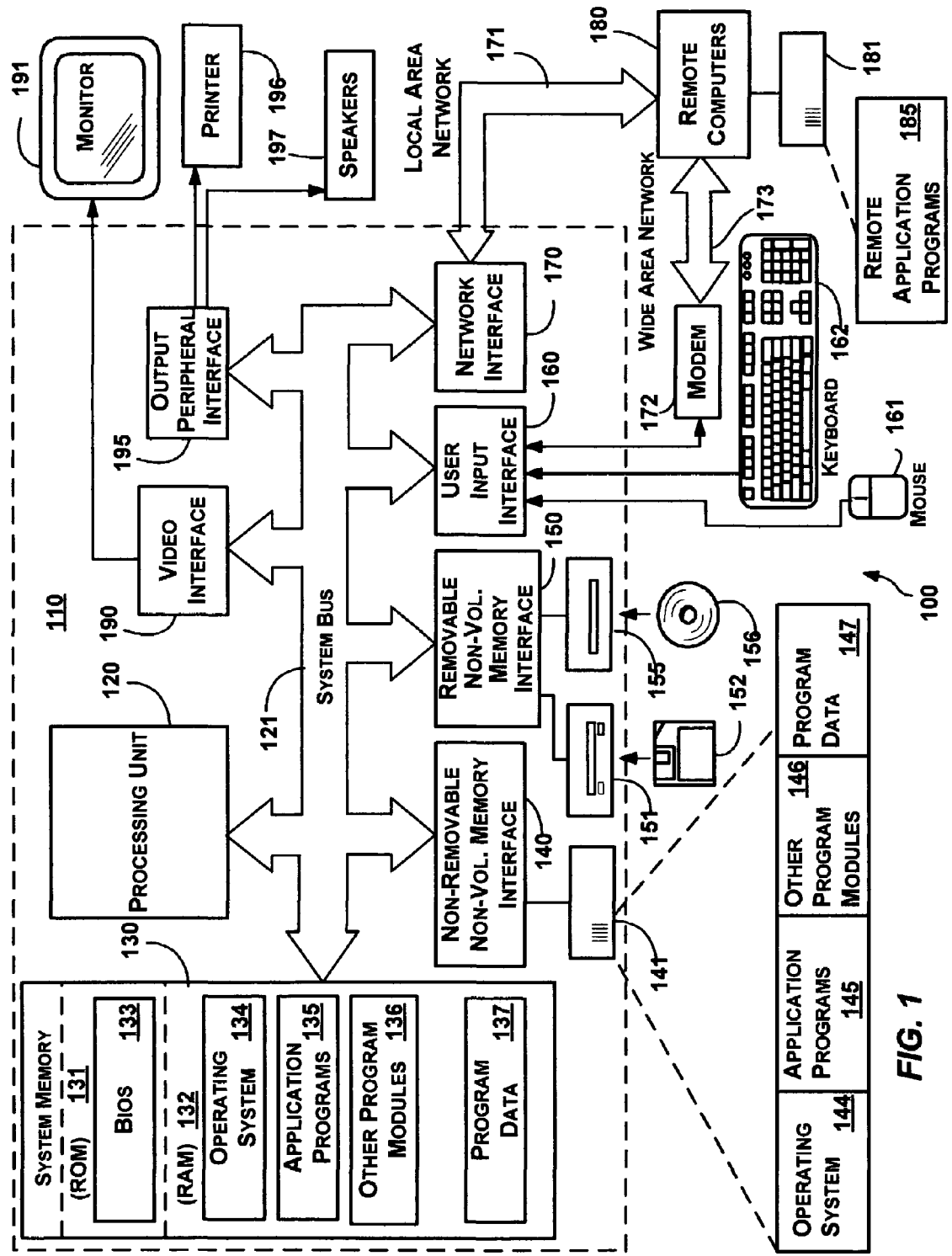
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Limiting Resources Consumed

Figure 2:
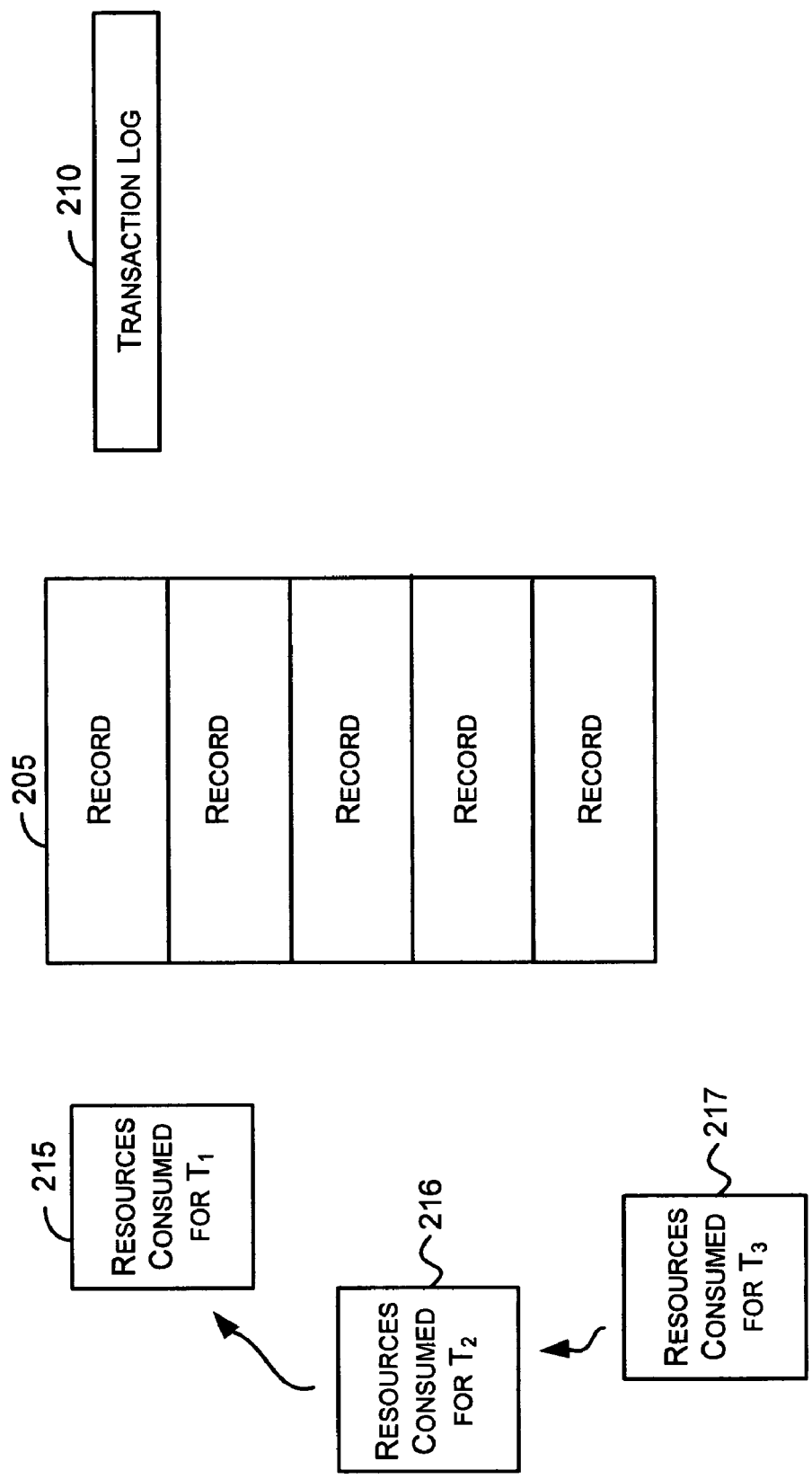
FIG. 2 is a block diagram representing an exemplary version store with which the invention may be practiced in accordance with various aspects of the invention.

FIG. 2 is a block diagram representing an exemplary version store with which the invention may be practiced in accordance with various aspects of the invention. The version store includes a database 205, a transaction log 210, and resources consumed 215-217 for a number of transactions. The resources consumed 215-217 may be partially or completely stored in the transaction log 210. The subscript for each transaction indicates the temporal order in which the transaction was started. For example, transaction $T_1$ was started before transaction $T_2$ which was started before transaction $T_3$.

In a version store, each time a client (not shown) initiates a transaction with the database 205, a "snapshot" of the database is created. Logically, a "snapshot" is a duplicate of the database at a particular point in time. Rather than creating an entire new copy of a database when a snapshot is created, a transaction log may be used to track differences (e.g., deltas) in the database from the time the transaction was initiated such that the state of the database at the time the transaction was initiated may be derived from the transaction log.

A transaction is atomic, consistent, isolated, and durable. During a transaction, changes to various records may occur. Instead of changing records directly in a database, the records to be changed may be copied and the copies modified. Other clients of the database may not be able to see these changes until the transaction is committed. When the transaction is committed, these changes are propagated to the database in an atomic operation. The changes may be propagated to the database by copying the modified copies back into the database. If the transaction is aborted, the changes are discarded and not propagated to the database. Changes may be stored in the transaction log 210 at least until the transaction is committed or aborted.

During a transaction, records to be changed may be copied to the transaction log 210. These copied records consume resources in the transaction log 210. If the transactions are all fixed in size, the amount of resources consumed for each transaction may also be fixed. If the transactions may vary in size, the amount of resources consumed for each transaction may also vary.

Version stores may be implemented in other ways, but even in such version stores, resources are consumed when a transaction is in-progress and may continue to be consumed even after the transaction commits or aborts. A version store may be implemented in a variety of ways without departing from the spirit or scope of the present invention.

More than one transaction may be in-progress at a time. The resources associated with an in-progress transaction may not be able to be returned for reuse until all transactions that were initiated before the transaction have completed (i.e., committed or aborted). This is shown by the dependency arrows between the resources consumed for transactions 215-217. For example, if $T_3$ occurs while $T_1$ is in progress and then $T_3$ commits, the resources consumed for $T_3$ 217 may not be able to be released until the resources consumed from $T_1$ 215 are released.

More formally, given transactions $T_1$ through $T_n$ that are issued in temporal order (i.e., $T_1$ precedes $T_2$, which precedes $T_3$, and so on), let $\delta_1$ through $\delta_n$ represent the amount of resources consumed by each transaction. Then, $\Sigma \delta_i$, where $1 \leq i \leq n$, is the total amount of resources consumed at any time when transactions $T_1$ through $T_i$ are in-progress.

When transaction $T_k$ completes, however, the amount of resources that can be released is either:

1. Zero if there exists an outstanding transaction $T_i$ such that i<k; or
2. Given j, such that j>k and $T_j$ is an in-progress transaction, then the amount of resources that may be released is $\Sigma \delta_i$ for all i such that ((k<i<j) and ($T_i$ has completed)). Note, that j may indicate that no transactions are still in-progress that were started after $T_k$. J may indicate this by being set to infinity or a number indicating a maximal value.

Another way of stating the above conditions for releasing resources is that at the completion of $T_k$ no resources may be released unless $T_k$ is the oldest transaction (i.e., no i<k such that $T_i$ is an in-progress transaction).

To avoid needing more resources than a total amount of resources that may be consumed at any given time, a client of a version store may be assigned a limit of resources over which the client may not go. The client may determine whether initiating a transaction may exceed the limit and block (e.g., wait) until enough resources are available to ensure that the client may complete whatever transaction the client is initiating without exceeding the total amount of resources that may be consumed. The total amount of resources that may be consumed by a client at any given time is sometimes referred to hereafter as $\Theta$.

To limit the number of in-progress transactions by causing a client to block until resources become available, the following three primitives may be used: InitializeResource($\rho$), AcquireResource(T, $\delta$), and ReleaseResource(T).

InitializeResource($\rho$) may be called at any time before the first transaction is started. When InitializeResource($\rho$) is called, the total number of resources consumed (hereinafter $\sigma$) is assigned to the residual amount of resources that are consumed when no transactions are in-progress. For example, there may be overhead associated with maintaining version stores such as creating data structures and the like. This overhead may be accounted for by InitializeResource($\rho$) where $\rho$ equals the amount of resources consumed when no transactions are in-progress. Unless $\sigma<\Theta$, no transactions may be allowed to begin.

AcquireResource(T, $\delta$) may be called before starting a transaction identified by T, where T is a unique object in memory allocated for each transaction by the caller. AcquireResource(T, $\delta$) checks for the condition: $(\delta+\sigma)<=\Theta$, and if this condition is true, it returns, letting the caller start a new transaction that consumes resources amounting to $\delta$. If the condition is false, AcquireResource(T, $\delta$) blocks until the above condition is met, assigns $\sigma$ to $\delta+\sigma$, and then returns.

ReleaseResource(T) may be called after the transaction T has completed. ReleaseResource(T) may be implemented as a non-blocking primitive.

In one embodiment of the invention, $\delta$ may be chosen to be the predicted number of updates in each transaction. On average, this number may turn out to be a constant. In this case, $\delta$ may be chosen to be 1 or any other constant as long as $\Theta$ is calculated in terms of $\delta$. If $\delta$ may vary from transaction to transaction, $\delta$ may be expressed as a multiple of a baseline number of resources. For example, a caller may know that it will modify four records in a version store and may pass a $\delta$ that is four times the $\delta$ passed when only modifying one record.

In another embodiment of the invention, $\delta$ may be characterized in the form of credits wherein the total available credits equals $\Theta$ and $\delta$ is computed for each transaction by the caller.

Classic semaphores may be used to track resource usage. Semaphores are variables that can be initialized to an integer value and provide the following three operations:

I(semaphore, $\delta$): This operation initializes the semaphore to $\delta$;

P(semaphore, $\delta$): This operation blocks until the semaphore >=$\delta$ and then subtracts $\delta$ from semaphore before returning; and V(semaphore, $\delta$): This operation adds $\delta$ to the semaphore, wakes up any threads which are blocked on the semaphore, and then returns.

Each of the operations above is atomic. Ideally, V will wake up exactly as many threads as $\delta$ can satisfy. In various Windows® operating systems, these operations may be implemented by CreateSemaphore( ), WaitForSingleObject( ), and ReleaseSemaphore( ), respectively. Other operating system may implement these operations with other calls without departing from the spirit or scope of the present invention.

Given the above primitives, $\sigma$ may be implemented as a semaphore that is initialized to $\Theta$, the total amount of resources allowed to be consumed. AcquireResource( ) may be implemented to issue P($\sigma$, $\delta$). This guarantees that the total number of resources consumed will be $<=\Theta$.

Figure 3:
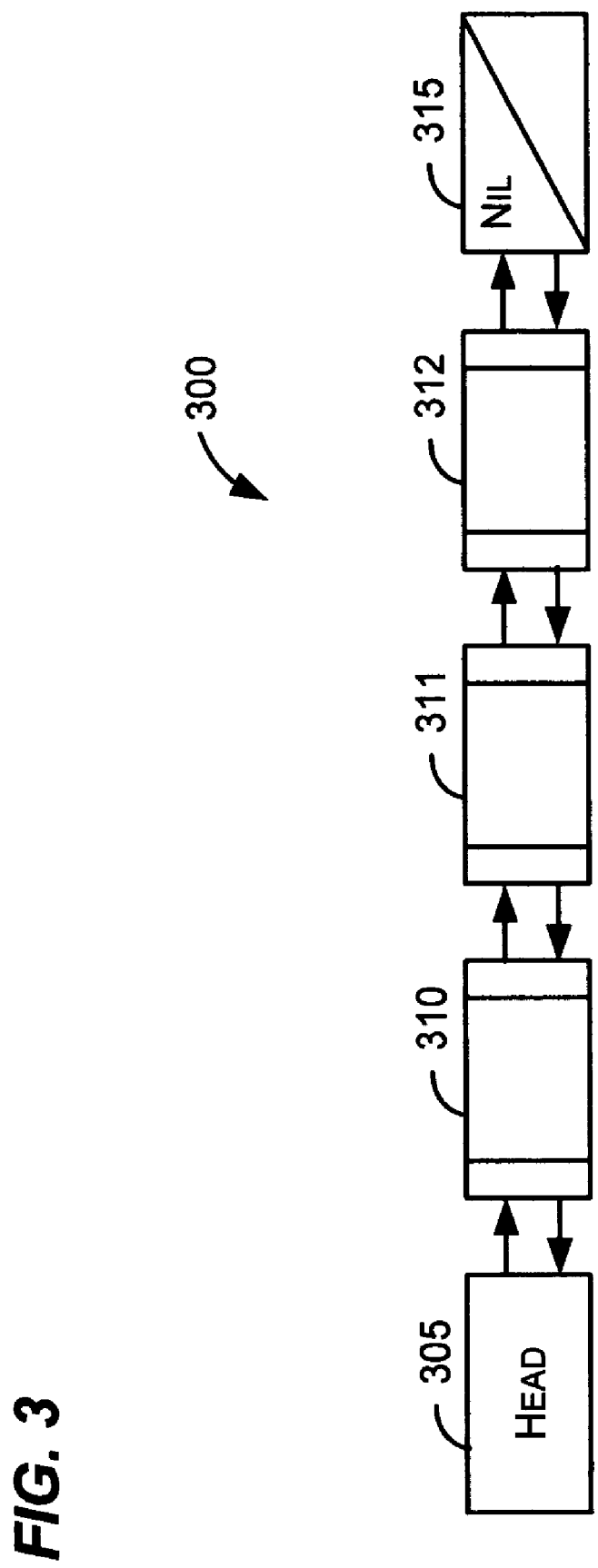
FIG. 3 is a block diagram illustrating an exemplary data structure in accordance with various aspects of the invention.

ReleaseResource( ) may not signal the semaphore V($\sigma$, $\delta$), if there is an in-progress transaction that is older than T. To determine whether there are older in-progress transactions, a doubly-linked list 300 as shown in FIG. 3 may be utilized. The list 300 is empty when the only nodes included in the list are the head node 305 and the nil node 315. The head of the list is the first node linked to by the head node 305 (i.e., node 310) as long as it is not the nil node 315. Each of the internal nodes 310-312 may correspond to a transaction and may include an identifier T and an amount of resources that are consumed by the transaction.

At any given point, the doubly-linked list may comprise HEAD ⇆ $T_i$ ⇆ $T_j$ ⇆ $T_k$ ⇆ ... ⇆ NIL wherein the transactions are temporally ordered left to right. A function may be implemented that returns the amount of resources consumed by T Hereafter, the amount of resources consumed by T is sometimes referred to as $\Delta(T)$. To store the amount of resources associated with each node, memory may be reserved in each node.

A lock to guarantee mutual exclusion to the list may also be implemented. Some exemplary locks include a spinlock, mutex, synchronization event, and the like. It will be recognized, however, that any lock that guarantees mutual exclusion to the list may be used without departing from the spirit or scope of the invention. The lock may be used guard against the list being changed by another process during a list insertion, traversal, or lookup. In this document, these lock primitives are sometimes referred to as AcquireListLock( ) and ReleaseListLock( ).

An exemplary algorithm for acquiring resources for a transaction is as follows:

```
AcquireResource(T, δ)
{
    If (δ > Θ) return error;    // This request can never be
                                // satisfied
    Obtain memory for T;
    Initialize Δ(T) to δ;
    P(σ, δ);                    // this may block
    AcquireListLock( );
    Insert T at the tail of the list;
    ReleaseListLock( );
    return;
}
```

Figure 4:
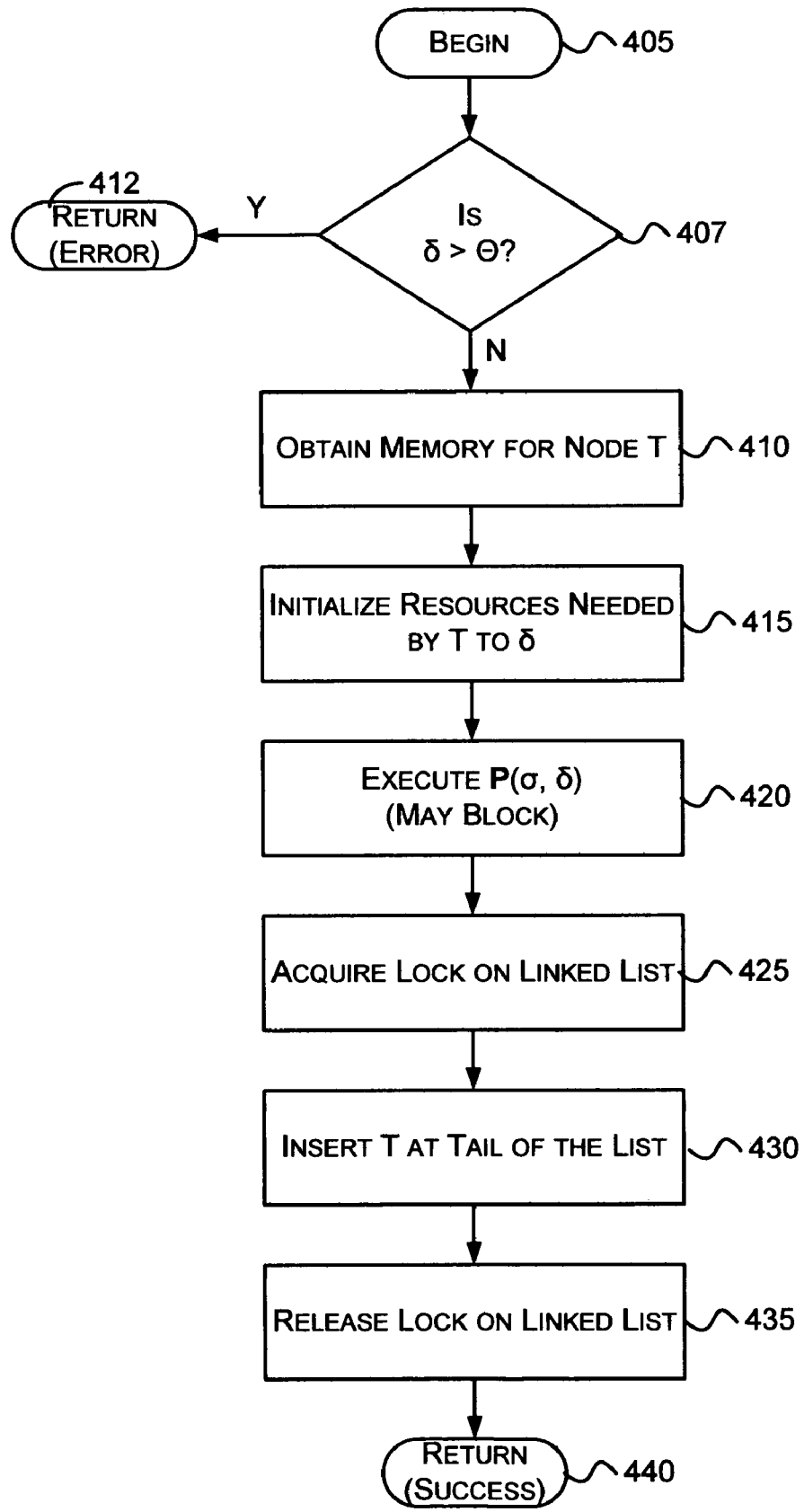
FIG. 4 is a flow diagram that generally represents actions that may occur in acquiring resources in order to start a transaction in accordance with various aspects of the invention.

The algorithm above is called before starting a transaction and is depicted in FIG. 4 which is a flow diagram that generally represents actions that may occur in acquiring resources in order to start a transaction in accordance with various aspects of the invention.

At block 405, the process begins. At block 407, a determination is made as to whether δ>Θ. If so, processing branches to block 412 which returns with an error. If not, processing branches to block 410. Having δ>Θ indicates that the transaction may potentially use more resources than the total amount of resources that are allowed to be used. Rather than blocking forever waiting for enough resources to become available (which will not occur), an error is returned at block 412.

At block 410, memory is obtained for the node. At block 415, a variable in the node that indicates the resources potentially needed by the transaction T is initialized to δ. At block 420, P(σ, δ) is executed which may block (until more resources become available). At block 425, a lock is acquired on a linked list. At block 430, the node is inserted at the tail of the list. At block 435, the lock is released. At block 440, the process returns with an indication of success.

Figure 5:
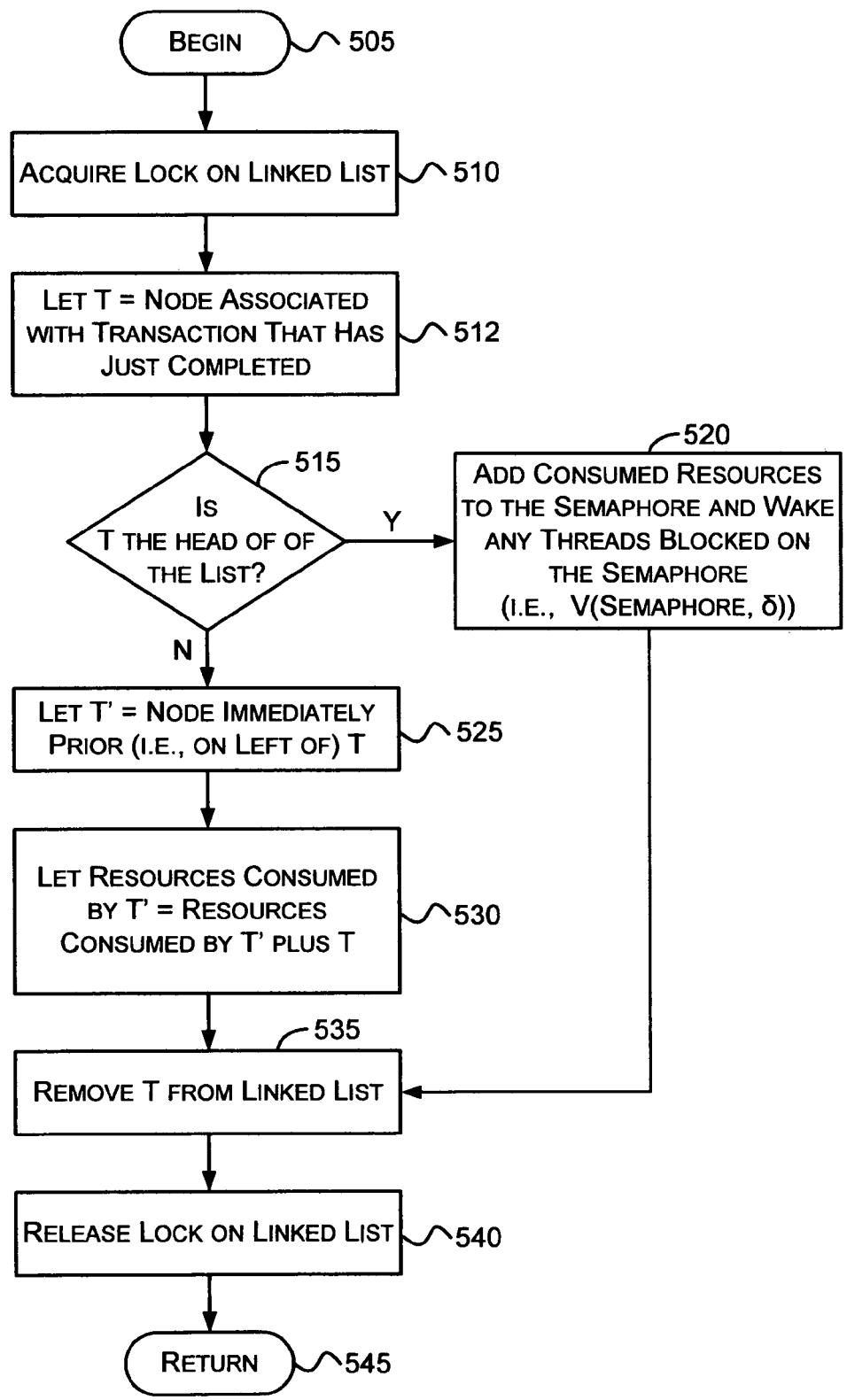
FIG. 5 is a flow diagram that generally represents actions that may occur before releasing resources after a transaction has completed in accordance with various aspects of the invention.

FIG. 5 is a flow diagram that generally represents actions that may occur before releasing resources after a transaction has completed in accordance with various aspects of the invention. The process is called before committing or aborting a transaction. At block 505, the process begins. At block 510, a lock is acquired on the linked list. At block 512, the node (i.e., T) associated with the transaction that has just completed is located. At block 515, a determination is made as to whether T is the head of the list. Recall that T is the head of the list if the head node points to T. If T is the head of the list, processing branches to block 520; otherwise, processing branches to block 525.

At block 520, the consumed resources indicated by T are added to the semaphore and any threads that are blocked on the semaphore are awakened. Note that the consumed resources indicated by T may be adjusted upwards when a transaction associated with a node immediately to the right of the node completes (e.g., see blocks 525 and 530).

At block 525 and 530, preparations are made to add the resources indicated by T to the node immediately to the left of T (i.e., T'). Note that T' is guaranteed to exist as T is not the head of the list. At block 525, T' is located. At block 530, the consumed resourced indicated by T are added to the consumed resources indicated by T'.

At block 535, T is removed from the linked list. At block 540, the lock on the linked list is released. At block 545, the process returns.

In terms of primitives described previously, this algorithm may be expressed as follows:

```
ReleaseResource(T)
{
    AcquireListLock( );
    //
    // If T is the oldest transaction, then we can release its
    // resources completely
    //
    if (T is the head of the list) {
        V(σ, Δ(T));    // release all resources and wake up any
                        // threads that are blocked
    } else {
        //
        // Since there are older transactions outstanding,
        // T may not release its resources
        // until all the outstanding transactions are finished.
        //
        T' = LeftLink(T);
        //
        // LeftLink( ) obtains the transaction that is essentially
        // the immediately preceding, temporally, transaction of
        // T. This is guaranteed non-NIL since T is not the head
        // of the list.
        //
        Δ(T') ← Δ(T') + Δ(T);    // propagate the resources
                                  // consumed up the chain
    }
    Remove(T) from the list;
    Free memory for T;
    ReleaseListLock( );
    return;
}
```

Although, FIGS. 3-5 have been described in reference to a doubly-linked list so that an O(1) implementation was achieved for the acquire/release primitives, it will be recognized that other data structures may be used including hash tables, singly-linked lists, arrays, hierarchical structures, and the like. Indeed, any data structure capable of maintaining temporal order of transactions may be used without departing from the spirit or scope of the invention.

Figure 6:
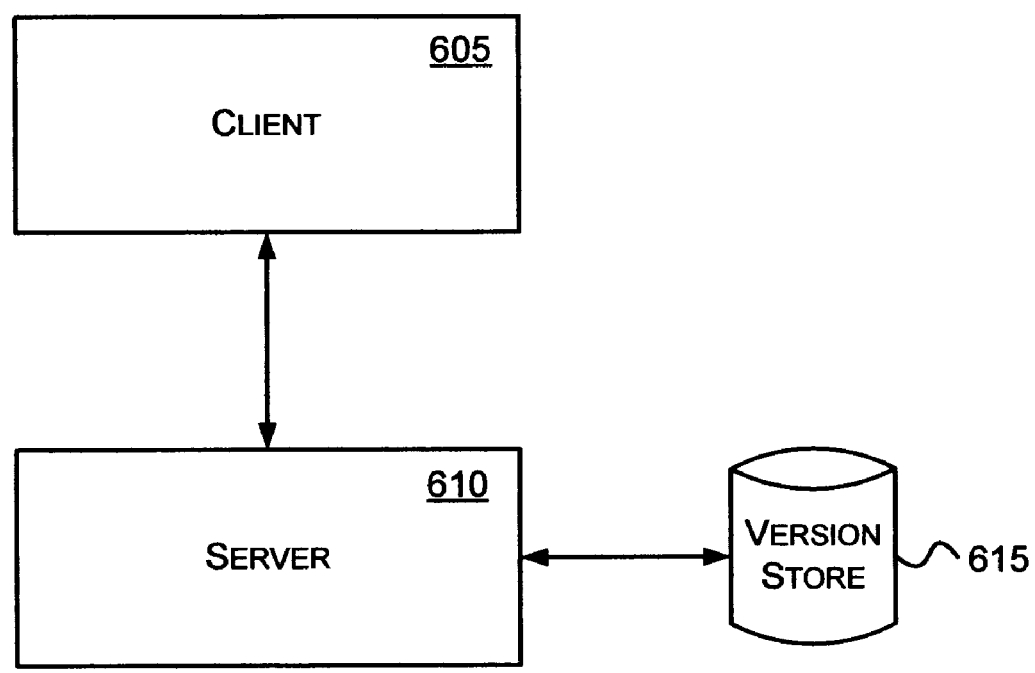
FIG. 6 is a block diagram representing an exemplary environment in which the invention may be practiced in accordance with various aspects of the invention.

FIG. 6 is a block diagram representing an exemplary environment in which the invention may be practiced in accordance with various aspects of the invention. The environment includes a client 605, a server 610, and a version store 615. In one embodiment of the invention, the processes described in conjunction with FIGS. 4 and 5 execute on the client 605 while the server 610 receives version store requests and performs the actions necessary to maintain the version store 615. In this embodiment of the invention, the resource limit that the client uses to limit its transactions may be selected by the client, the server, a special-purpose program, a computer administrator, or the like. In one embodiment of the invention, the client 605 may query the server 610 to determine what number of resources the server 610 may dedicate to the client 605 without significantly degrading performance to other clients. Note that any of the client 605, the server 610, and the version store 615 may be included together on one machine or may be on separate machines without departing from the spirit or scope of the present invention.

Figure 7:
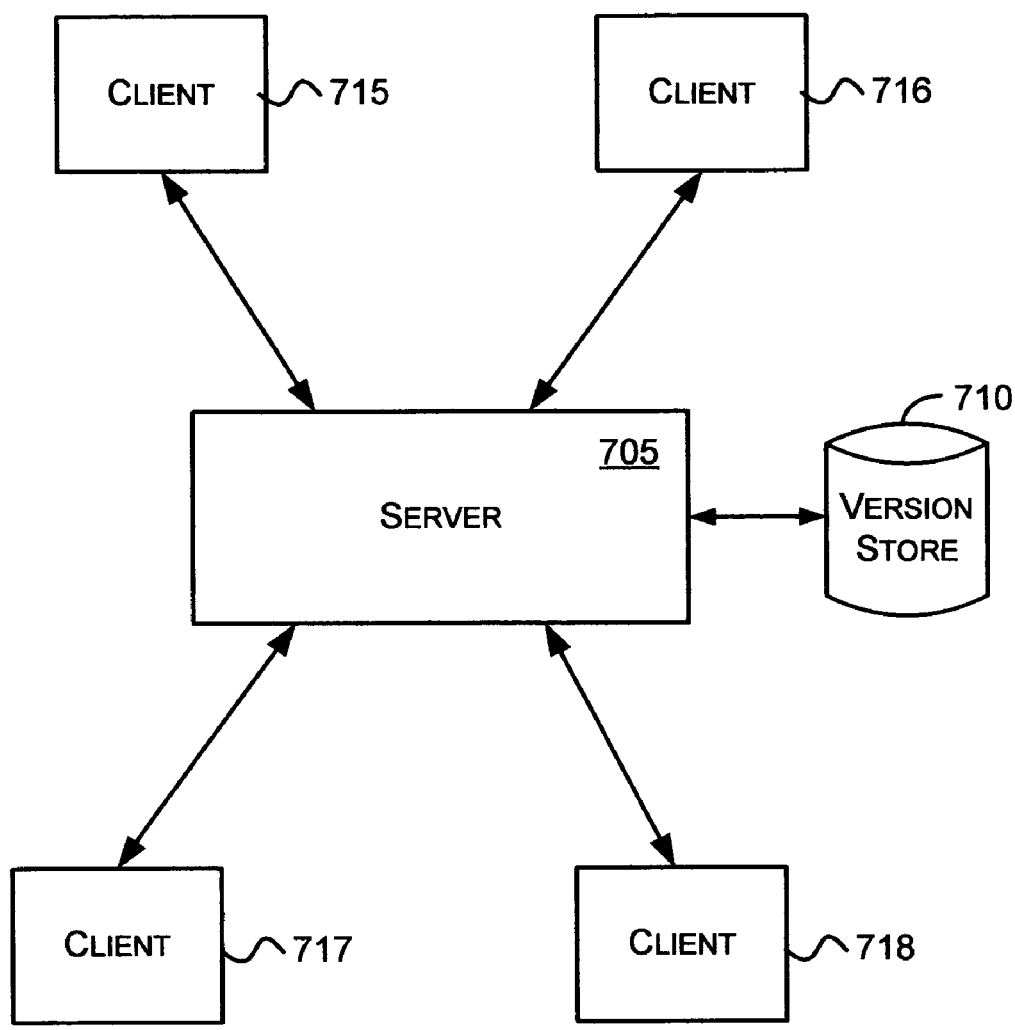
FIG. 7 is a block diagram representing another exemplary environment in which the invention may be practice in accordance with various aspects of the invention

FIG. 7 is a block diagram representing another exemplary environment in which the invention may be practice in accordance with various aspects of the invention. The environment includes a server 705, a version store 710, and four clients 715-718. In the embodiment shown in FIG. 7, each of the clients 715-718 may attempt to open transactions with version store 710. To ensure that the combined activities of the clients does not cause resources consumed in performing transactions to exceed a global limit, each client may be assigned a limit such that the even if all clients reach their limit that the global limit will not be exceeded. The resource limit for each client may be determined by the client, the server, negotiation between the clients, a special-purpose program, a computer administrator, and the like. Determining the resource limit for each client may occur before the client engages in transactions with the version store 710 and may change dynamically. For example, if the client 715 is frequently blocking while the client 716 does not consume more than a certain amount of resources, the resource limit associated to the client 716 may be reduced while the resource limit assigned to the client 715 may be increased.

As can be seen from the foregoing detailed description, there is provided a method and system for limiting resource usage of a version store. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable medium comprising a storage media having computer executable instructions which, when executed by a computing system cause the computing system to implement a method for limiting resource usage of a version store, the method comprising:
    identifying a total resource limit, L, the limit indicating an amount of resources which cannot be exceeded by a total sum of all the resources consumed by all in-progress transactions with a version store;
    identifying a residual resource amount, o, the residual resource amount being the amount of resources consumed when no transactions are in progress;
    initializing a sum, S1, to the residual resource amount, δ, of a transaction;
    determining whether the residual resource amount, o, is greater than the limit, L;
        when the residual resource amount, o, is greater than the limit, L, then returning an error; and
    when the residual resource amount, δ, is not greater than limit L, for each transaction, $T_i$, wherein the subscript i being a positive integer, of a plurality of transactions relating the version store, acquiring resources necessary for processing the transaction by:
        obtaining a lock of a data structure that tracks the amount of resources potentially used in completing the plurality of transactions related to the version store;
        identifying the amount of resources, $R_i$, wherein the subscript i being said a positive integer, necessary for processing the each transaction $T_i$;
        determining if a sum, S2=(S+Ri), is greater than the limit, L;
            when the sum, S2=(S+Ri), is not greater than the limit, L, then setting the sum, S 1, to (S+Ri) and starting the transaction $T_i$;
            when the sum, S2=(S+Ri), is greater than the limit, L, then waiting until sufficient resources are available;
        modifying the data structure to include information related to the new transaction; and
        releasing the lock thereafter.

2. The computer-readable medium of claim 1, further comprising setting a limit to the amount of resources potentially used by the plurality of transactions.

3. The computer-readable medium of claim 1, wherein the version store creates a new snapshot of a database before each transaction starts.

4. The computer-readable medium of claim 3, wherein the snapshot is maintained as differences in a log file.

5. The computer-readable medium of claim 3, wherein the database has a first state before the new snapshot is created and the first state of the database is createable from the log file together with a second state of the database.

6. The computer-readable medium of claim 1, wherein waiting until more resources are available comprises blocking a thread until the resources are available.

7. The computer-readable medium of claim 1, wherein the data structure comprises a doubly-linked list and wherein modifying the data structure to include information related to the new transaction comprises adding a node to the data structure.

8. The computer-readable medium of claim 1, wherein the data structure orders the transactions temporally.

9. The computer-readable medium of claim 1, further comprising completing a transaction and, when the completed transaction started before all of a plurality of transactions still in progress, modifying an amount of resources used in completing the plurality of transactions by subtracting the amount of resources used by the completed transaction.

10. The computer-readable medium of claim 1, further comprising completing a transaction and, when the completed transaction started after all other transactions that are still in-progress, not modifying an amount of resources potentially used by a plurality of transactions.

11. The computer-readable medium of claim 10, further comprising modifying data associated with a previous transaction that is in-progress to add an amount of resources potentially used by the transaction that has completed.

12. The computer-readable medium of claim 11, further comprising completing the previous transaction and modifying the amount of resources potentially used to release the amount of resources indicated by the data.

13. The computer-readable medium of claim 1, wherein waiting until more resources are available comprises blocking on a semaphore.

14. A method within a computing system for limiting resource usage of a version store based on the amount of available resources of the version store, the method comprising:
    identifying a total resource limit, L, the limit indicating an amount of resources which cannot be exceeded by a total sum of all the resources consumed by all in-progress transactions with a version store;

identifying a residual resource amount, $\delta$, the residual resource amount being the amount of resources consumed when no transactions are in progress;

initializing a sum, S 1, to the residual resource amount, $\delta$, of a transaction;

determining whether the residual resource amount, $\delta$, is greater than the limit, L;

when the residual resource amount, $\delta$, is greater than the limit, L, then returning an error; and when the residual resource amount, $\delta$, is not greater than the limit, L, then, for each transaction, Ti, wherein the subscript i being a positive integer, of a plurality of transactions relating the version store, acquiring resources necessary for processing the transaction by:

obtaining a lock of a data structure that tracks the amount of resources potentially used in completing the plurality of transactions related to the version store;

identifying the amount of resources, Ri, wherein the subscript i being said a positive integer, necessary for processing the each transaction Ti;

determining if a sum, S2=(S+Ri), is greater than the limit, L;

when the sum, S2=(S+Ri), is not greater than the limit, L, then setting the sum, S 1, to (S+Ri) and starting the transaction Ti;

when the sum, S2=(S+Ri), is greater than the limit, L, then waiting until sufficient resources are available;

modifying the data structure to include information related to the new transaction; and releasing the lock thereafter.

15. The method of claim 14, further comprising initializing the sum, S, to the limit, L.

16. The method of claim 14, further comprising adjusting the sum, S, to take account of the resources potentially required by a new transaction.

17. The method of claim 14, wherein determining if sum (S+R), is grater than the limit, L, comprises subtracting the amount of resources from a running total to obtain a result and determining if the result is zero or greater.

18. The method of claim 14, further comprising obtaining a lock on a data structure and modifying the data structure.

19. The method of claim 18, wherein the data structure is a doubly-linked list that is temporally ordered according to start times of in-progress transactions.

20. The method of claim 18, further comprising determining if a node of the doubly-linked list that is associated with a just-completed transaction is at the head of the doubly-linked list.

21. The method of claim 20, wherein if the node is at the head of the doubly-linked list, increasing the running total by an amount indicated by the node.

22. The method of claim 20, wherein if the node is not at the head of the doubly-linked list, adding resources indicated by the node to another node in the doubly-linked list that precedes the node and removing the node.

23. The method of claim 14, further comprising increasing a running total after a transaction completes and awakening any threads associated with new transactions that have blocked as a result of having insufficient resources to start.

* * * * *